United States Patent
Beck et al.

Patent Number: 5,493,899
Date of Patent: Feb. 27, 1996

[54] METHOD FOR TESTING INTEGRITY OF ELASTOMERIC PROTECTIVE BARRIERS

[75] Inventors: William C. Beck, Sayre, Pa.; Donald H. Beezhold, Owego, N.Y.

[73] Assignee: Donald Guthrie Foundation for Education and Research, Sayre, Pa.

[21] Appl. No.: 248,059

[22] Filed: May 23, 1994

[51] Int. Cl.$^6$ ............................ G01M 3/26; G01M 3/02
[52] U.S. Cl. .................. 73/40.7; 73/40; 73/38; 73/104; 436/3
[58] Field of Search .............. 73/40, 40.5, 40.7, 73/38, 104, 3; 436/3

[56] References Cited

U.S. PATENT DOCUMENTS

| | | | |
|---|---|---|---|
| 2,054,204 | 9/1936 | McDonald | 73/40 |
| 2,074,140 | 3/1937 | Bates | 73/38 |
| 2,126,434 | 8/1938 | Vosbury | 73/38 |
| 2,370,945 | 3/1945 | Fields | 73/38 |
| 2,800,788 | 7/1957 | Smith | 73/38 |
| 2,988,913 | 6/1961 | D'Amico | 73/38 |
| 3,254,526 | 6/1966 | Yarbrough | 73/45.5 |
| 3,315,519 | 4/1967 | Ferguson | 73/38 |
| 3,603,138 | 9/1971 | Peterson | 73/37 |
| 3,991,604 | 11/1976 | Hayes et al. | 73/37 |
| 4,206,631 | 6/1980 | Nysse et al. | 73/40 |
| 4,321,925 | 3/1982 | Hoborn et al. | 128/303.13 |
| 4,369,120 | 1/1983 | Stelz et al. | 252/68 |
| 4,745,797 | 5/1988 | Wegrzyn | 73/40.7 |
| 4,799,384 | 1/1989 | Casali | 73/45.5 |
| 4,909,069 | 3/1990 | Albin et al. | 73/40 |
| 4,956,635 | 9/1990 | Langdon | 340/540 |
| 5,014,544 | 5/1991 | West | 73/40.7 |
| 5,050,426 | 9/1991 | Torres-Ibanez | 73/45.5 |
| 5,073,482 | 12/1991 | Goldstein | 435/5 |
| 5,129,256 | 7/1992 | McGlothlin | 73/40 |
| 5,138,871 | 8/1992 | Retta et al. | 73/38 |
| 5,255,558 | 10/1993 | Hamilton | 73/40 |
| 5,351,008 | 9/1994 | Leach et al. | 324/557 |

OTHER PUBLICATIONS

Lytle, et al. "Virus Leakage Through Natural Membrane Condoms", pp. 58–62, 1990.

Retta, et al. "Test Method for Evaluating the Permeability of Intact Prophylactics to Viral–Size Microspheres Under Simulated Physiologic Conditions", pp. 111–118, 1991.

WO94/02819 Feb. 03, 1994, Lytle, et al., Apparatus and Method for Testing condoms as Barriers to Virus Penetration.

PHS 94–3 Omnibus Solicitation of the Public Health Service for Small busness Innovation Research (SBIR) Grant and Cooperative Agreement Applications, p. 158, #150.

*Primary Examiner*—Hezron E. Williams
*Assistant Examiner*—J. David Wiggins
*Attorney, Agent, or Firm*—Foley & Lardner

[57] ABSTRACT

A method of testing an elastomeric personal barrier which involves positioning the barrier over a mold in the shape of the barrier, the mold being translucent or of a contrasting color to the barrier, exposing the personal barrier to a non-corrosive solvent so that the solvent comes into contact with the exterior of the personal barrier only except where a flaw exists in the barrier, removing the personal barrier from contact with the solvent, and inspecting the exterior of the personal barrier for the appearance of one or more stains which indicate the presence of a flaw in the structural integrity of the barrier.

17 Claims, 3 Drawing Sheets

METHOD FOR TESTING INTEGRITY OF ELASTOMERIC PROTECTIVE BARRIERS

TECHNICAL FIELD

The present invention relates generally to improved methods of testing elastomeric protective barriers. More particularly, the present invention relates to methods for testing medical gloves, contraceptives and other personal barrier devices for any defects, holes, rips or other flaws in the structural integrity of the barrier.

BACKGROUND OF THE INVENTION

In recent years it has become increasingly important to ensure the integrity of personal barriers, whether these barriers protect against sexually transmitted diseases, the spread of infection during medical procedures, or simply protect the user against contact with relatively innocuous foreign substances.

In manufacturing processes, it is necessary to exercise stringent quality control in order to maintain a quality product. This is particularly important when manufacturing personal barriers which require only a minute flaw in order for the barrier to be defective and fail to achieve its purpose. Additionally, in the case of surgical gloves or contraceptive devices, any flaw in the barrier can lead to a considerable risk.

As surgical operating techniques become more highly developed and more frequently performed, the need for strictly aseptic conditions also increases. Medical personnel depend on surgical or examination gloves to help protect themselves and their patients from the spread of infection, such as hepatitis and AIDS. In order to accomplish this goal and maintain sterility in the medical environment, it is necessary for the gloves to have their structural integrity, i.e. their freedom from punctures, tears, manufacturing imperfections, defects and rips, assured prior to the gloves' sale.

Moreover, sexually transmitted diseases such as herpes and AIDS viruses pose critical health concerns. One of the most common methods to protect against the spread of these infectious diseases is the use of barrier contraceptive devices such as condoms. In order for these barrier contraceptives to be effective against contagious diseases, their structural integrity before use must be assured.

In the past, inflatable products such as gloves or condoms have been tested using a low pressure testing procedure, which included inflating the product and visually inspecting the product for pinholes or other signs of flaws within the surface of the product. The difficulty of this technique, which uses a low inflation pressure of 1-2 lbs per square inch, is that when a product such as a surgical glove is tested, the body of the glove is blown to a large size and the fingers are only slightly inflated, making it difficult to detect flaws in the glove fingers. Indeed, several minutes of the tester's time may be required in observing the fingers of the glove to determine if the product is defective.

Alternatively, a high pressure testing procedure used requires fastening to a circular mandrel the cuff of the glove to be tested. The glove is then inflated with air pressure to a gauge pressure of 1.5 Kpa and the inflated glove is then immersed in water at room temperature to a depth of 200+/−10 mm above the tip of the middle finger. The immersion time is typically on the order of 1.5 minutes. The emergence of air bubbles from the glove is a signal of structural failure in the integrity of the glove.

Latex examination gloves, surgical gloves, and contraceptive devices are conventionally tested for quality pursuant to a number of testing standards developed by the American Society of Testing Materials. Surgical gloves, for example, are tested by distending the glove with 1000 milliliters of water and observing the filled glove at room temperature in a vertical position for a period of time, such as, typically, a minimum of two minutes. The emergence of water from the glove signals a failure in the integrity of the glove. This time consuming test has the additional drawback that it is destructive to the item being tested and therefore cannot be used on 100% of gloves being manufactured but must instead be utilized on only a sample population.

Other methods of testing the structural integrity of elastomeric barriers in the prior art are even more complex. A liquid may be placed inside the barrier and the barrier partially immersed in a second liquid. A current is passed through the liquid inside the barrier, and a detecting means tracks any current increase in the liquid outside the barrier. Such technique is slow and messy and may preclude the use of a lubricant dust on the inside face of the barrier unless the lubricant dust is applied after testing, meaning that testing occurs prior to lubrication thereby reducing the reliability that the quality control testing is designed to induce.

U.S. Pat. No. 5,129,256 discloses a testing method for use in testing condoms for leaks by pressure differential, using a porous mandrel. However, the testing apparatus disclosed in the patent is cumbersome and requires the condom be taken off the mold on which it is formed and placed on the testing apparatus, thus requiring extra handling steps, adding to the danger of jeopardizing the structural integrity of the condom.

Other testing methods used by manufacturers of elastomeric barriers have ranged from batch testing to visual inspection of deflated barriers over a strong light. These techniques do not provide a high degree of accuracy in testing.

The present invention addresses the problems associated with the previous methods for testing the integrity of elastomeric articles. The present invention discloses a highly accurate method wherein the structural integrity of surgical gloves and other elastomeric articles may be tested with a minimum of expense, time, and extra materials. Further, the present invention allows an elastomeric personal barrier to be tested for structural integrity without removing the barrier from the mold on which the barrier was created, thereby reducing the handling of the barrier and the risk that additional handling may threaten the structural integrity of the barrier.

The present invention may also provide a substitute test for the American Society of Testing Materials. In addition, the present invention may obviate the need for air inflation as a current test of structural integrity of elastomeric products. Further, the present invention may provide a structural integrity test used during the manufacturing process and may present a nondestructive testing alternative which may be utilized with 100% of the personal barriers rather than a population sample.

SUMMARY OF THE INVENTION

Figure 1:
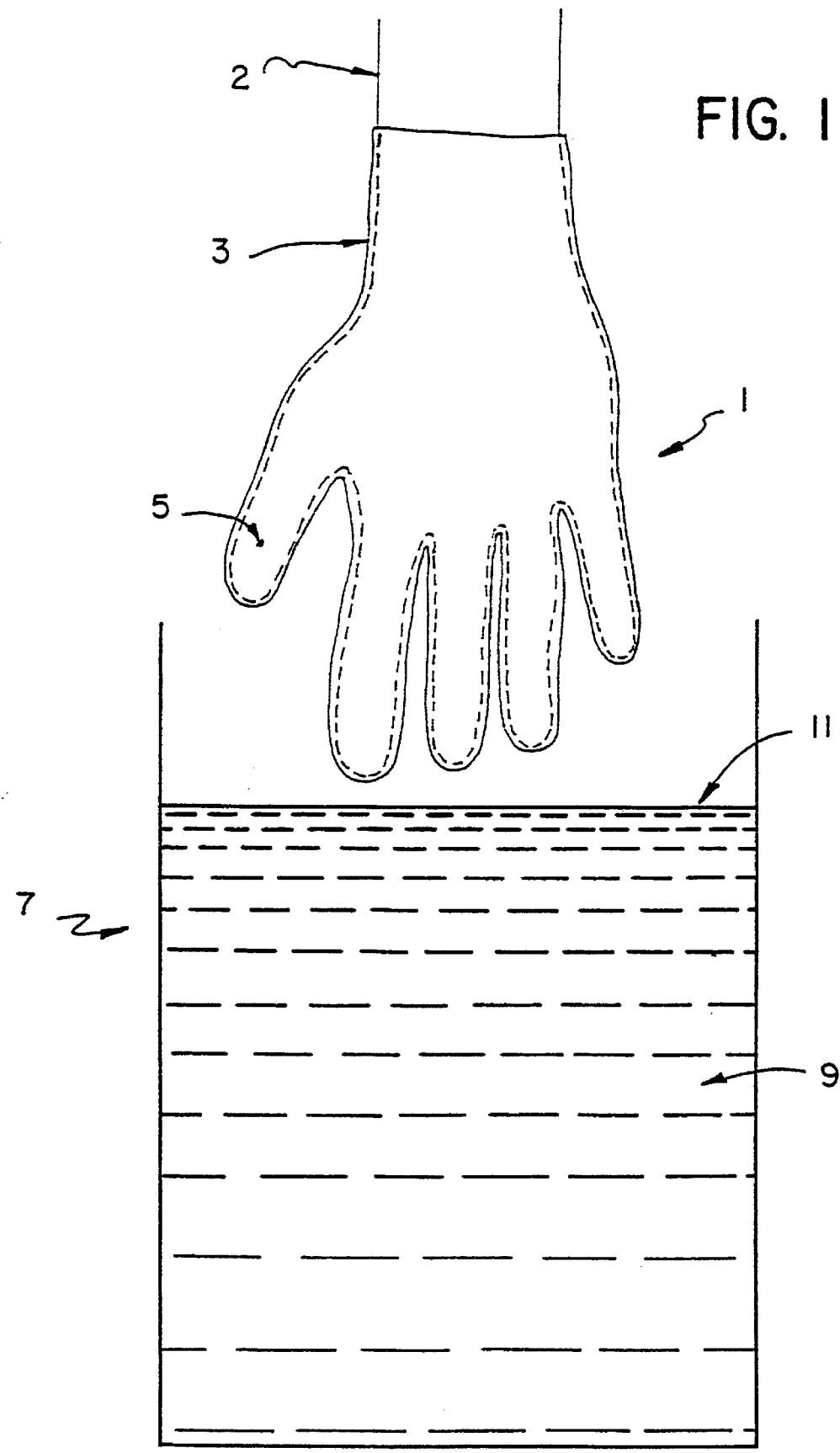
FIG. 1 is a schematic view illustrating the method and apparatus for testing a glove in accordance with the present invention.

It is an object of the present invention to provide a method which will overcome at least some of the above-mentioned disadvantages. Briefly stated, the invention in a preferred form is a method for testing the integrity of personal barriers such as conventional medical examination and surgical gloves and contraceptive materials for structural integrity during the manufacturing of the personal barrier.

Accordingly, in one aspect the present invention consists of a process for testing an elastomeric product, such as a surgical glove or contraceptive device, against leakage flaws, rips or holes which comprises:

(a) positioning a personal barrier over a mold, the mold being in the shape of the personal barrier;

(b) exposing the personal barrier to a non-corrosive solvent in such a way that the solvent comes into contact with the exterior of the personal barrier only, except where a defect exists in the personal barrier;

(c) removing the personal barrier from contact with the solvent;

(d) inspecting the exterior of the personal barrier for the appearance of stains indicating the presence of a flaw in the structural integrity of the barrier; and (e) rejecting said personal barrier as being defective if the exterior of the personal barrier exhibits one or more stains.

The stain on the surface of the elastomeric barrier which indicates a flaw in the structural integrity of the barrier is simply a layer of solvent which has become trapped between the interior surface of the barrier and the surface of the mold. If a low surface tension solvent is utilized in the process of the present invention, the greater the effects of adhesion and the smaller the effects of cohesion become, thus producing a stain with a larger radius, hence a greater visibility, than a stain produced by a high surface tension solvent.

The solvent may be any liquid which is non-corrosive to the elastomeric barrier. Preferably, the solvent comprises a non-toxic liquid with a surface tension less than or equal to 50 dyn/cm at 20° C. Preferred solvents include alcohols, most preferably, isopropyl alcohol or ethanol. Additionally, a surfactant may be added to a solvent, preferably an aqueous solvent, to lower the surface tension.

The solvent may be applied to the personal barrier by any means which results in an even and thorough application of solvent to the exterior of the personal barrier. Such means include, by way of example only, spraying the solvent on the barrier or immersing the barrier into the solvent. If the barrier is immersed in the solvent, the length of time the barrier should be immersed in the solvent is dependent upon the solvent used.

The test for structural integrity of the barrier is conducted with the barrier disposed over a mold. The mold is contoured in the shape of the personal barrier. The material from which the mold is constructed may be any conventional material known in the art used to produce molds for rubber, latex or other elastomeric articles. The mold material should preferably be of a contrasting color to the color of the substance used to create the elastomeric barrier. Alternatively, the mold may be formed of a translucent material. Preferably, the translucent mold will be hollow so a light source or contrasting colored liquid may be inserted into the interior of the mold to aid in the detection of stains upon the barrier. The barrier may be formed over the mold during manufacture, or placed on the mold at anytime prior to testing the barrier's structural integrity. It is preferred that the barrier be formed directly on the mold and then tested, thus ensuring that the entire inner surface of the barrier is in contact with the mold during structural integrity testing and also reducing the risk of damage to the barrier that additional handling presents.

For ease in applying the solvent to the exterior of the personal barrier, the solvent may be placed into a receptacle and the barrier inserted into the receptacle such that the solvent within the receptacle comes into contact with the exterior of the barrier only, except where a defect in the exterior of the barrier allows solvent to penetrate the barrier. The receptacle may be any basin appropriate for containing the solvent. Examples include, but are not limited to, stainless steel basins, glass basins, metal drums, polycarbonate resin tanks or other appropriate containers and receptacles. Alternatively, the solvent may be sprayed on the barrier or otherwise placed in contact with the barrier, in a manner in which the solvent comes into contact with the exterior of the barrier only.

The inspection of the personal barrier for stains may be accomplished by a variety of means, including, by way of example only, visual inspection and the use of an optical sensor.

The object of the invention is to provide a new and improved method for testing personal barriers used in medical or waste disposal applications or used in the prevention of disease.

A further object of the invention is to provide a new and improved method for testing personal barriers which is highly reliable and accomplished in an efficient and cost-effective manner.

A yet further object of the invention is to provide a new and improved method for testing gloves, condoms and other elastomeric barriers during the manufacturing process which may provide a substitute test for the current testing standards developed by the American Society of Testing Materials.

Other objects of the invention will become apparent from the drawings and specification.

DETAILED DESCRIPTION OF THE INVENTION

With reference to FIG. 1, the invention employs a personal barrier in the form of a latex glove designated generally by the numeral 1. Glove 1 is tested while disposed on a stiff, dark colored mold 2 on which glove 1 was manufactured, mold 2 being in the shape of an extended hand.

Referring to FIG. 1, the apparatus includes an open-top receptacle 7 for containing a body of solvent 9 into which glove 1 and mold 2 are to be immersed during the testing operation. One end of receptacle 7 is laterally extended so that glove 1 can fit within receptacle 7 easily. The height of receptacle 7 is sufficient so that solvent level 11 in receptacle 7 is approximately level to two inches below the upper edge of glove 1 when glove 1 and mold 2 are immersed in solvent 9.

Figure 2:
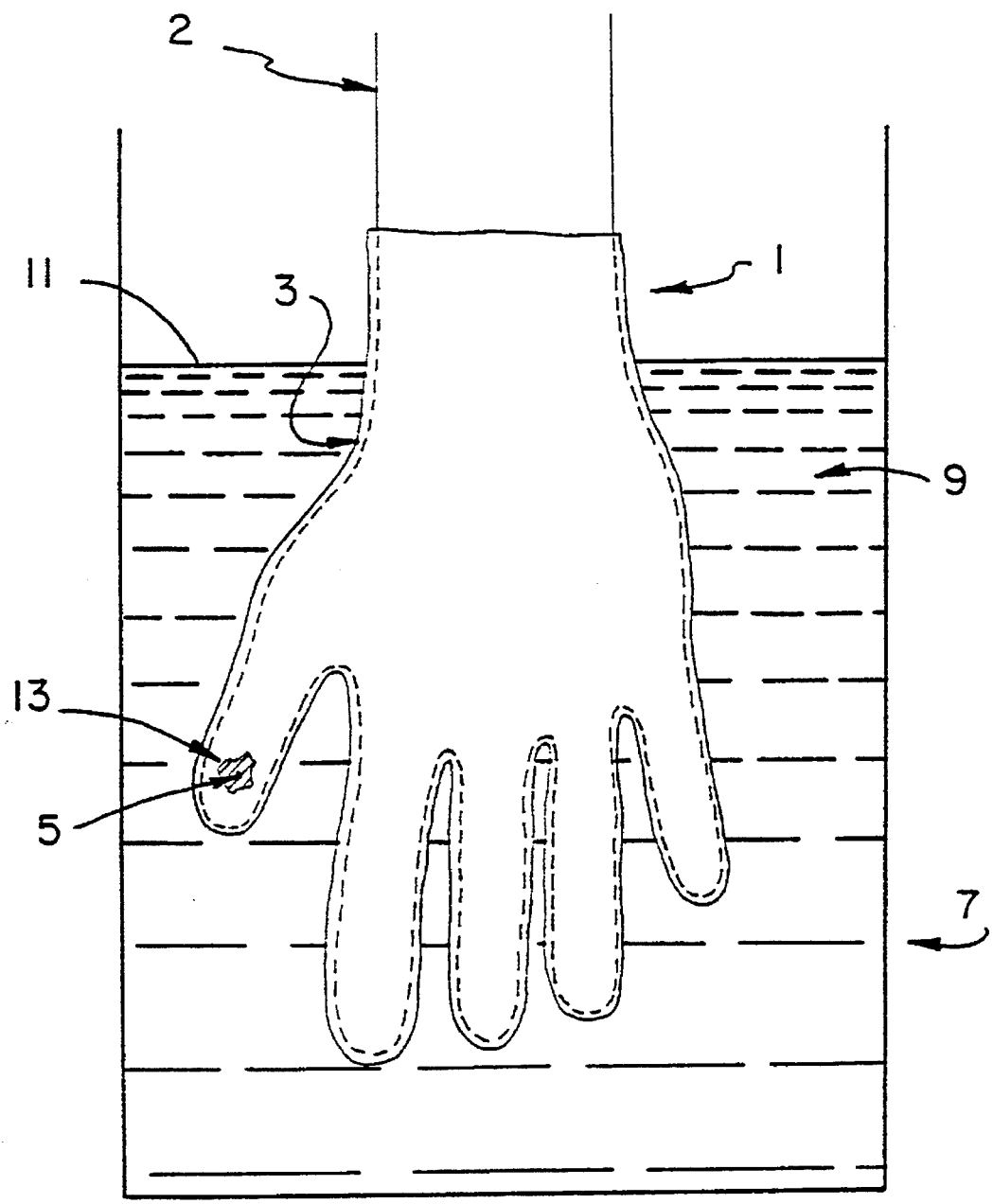
FIG. 2 is a schematic view illustrating the testing procedure showing a glove immersed in a solvent container in accordance with the present invention.

To test the structural integrity of a glove with the method of the current invention, glove 1 is fabricated over a dark colored mold 2 and glove 1 is allowed to solidify on mold 2. In the present example, a small pinhole 5, exists, extending through glove 1. After glove 1 has solidified, glove 1 is immersed in the solvent 9 to a point two inches below the upper edge of glove 1 as shown in FIG. 2. The solvent will penetrate glove 1 through pinhole 5, spreading out to form stain 13 located between glove 1 and mold 2. Stain 13 will be detectable when glove 1 is removed from solvent 9 and inspected to determine if glove 1 has retained its structural integrity.

Figure 3:
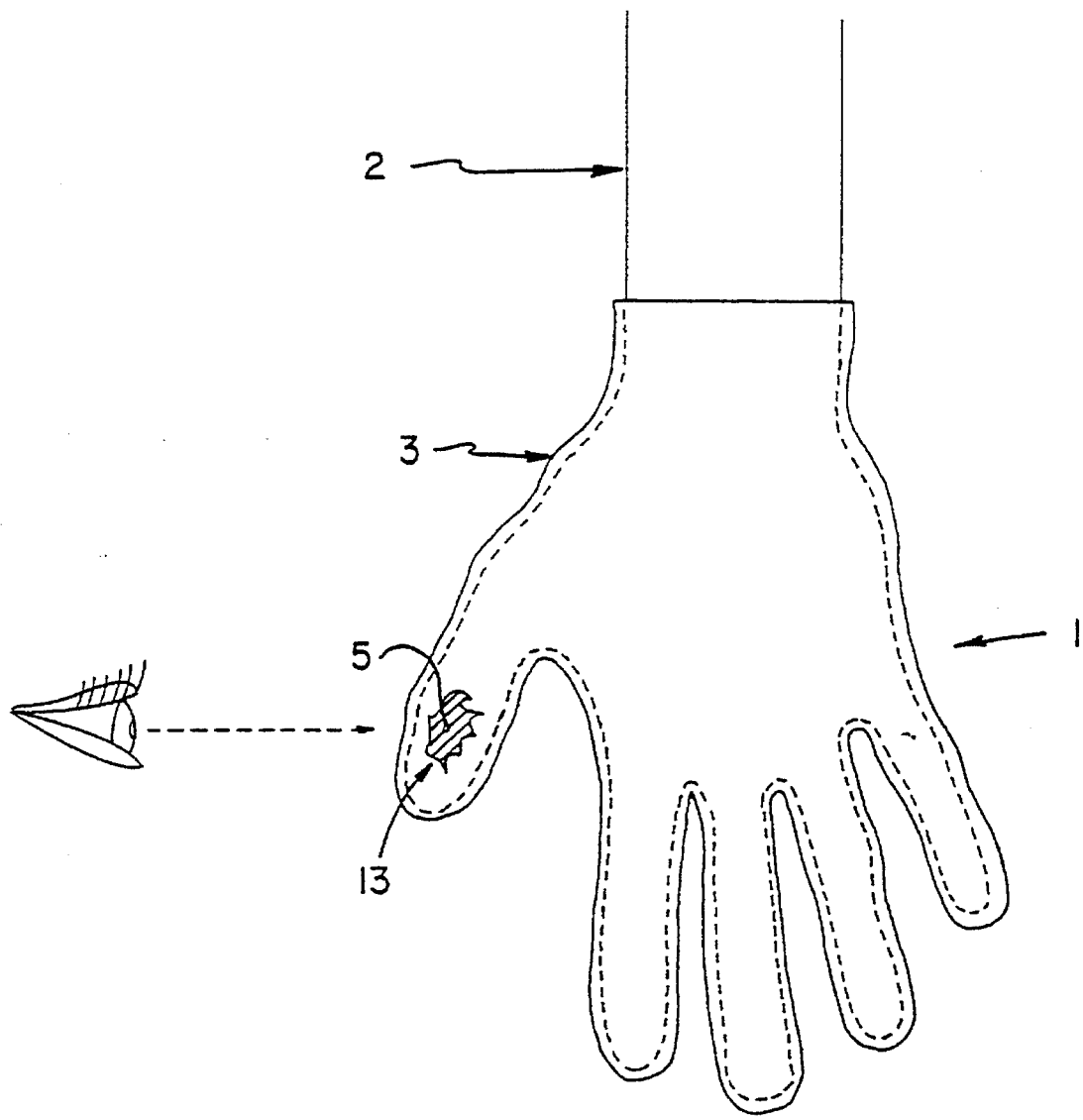
FIG. 3 is a schematic view illustrating the testing procedure showing visual detection of a stain appearing on a glove after immersion of the glove into a solvent in accordance with the present invention.

To determine whether glove 1 retains its structural integrity, the operator of the process must observe outer surface 3 of glove 1 carefully to in order to detect any stains appearing on outer surface 3 of glove 1 as shown in FIG. 3. The presence of such stains indicates a hole or flaw in glove 1. In the present example, stain 13 is visible on outer surface 3 of glove 1 when glove 1 and mold 2 are removed from solvent 9, at the point where pinhole 5 exists.

The approximate time required for the glove to be immersed in solvent is generally between 1 and 20 seconds but may varying depending on the solvent used.

The method of the present invention was comparison tested against American Society of Testing Materials ("ASTM") method D3492 for testing the structural integrity of condoms. The comparison test was performed to demonstrate alcoholic penetration of holes in condoms using the method of the current invention versus the ASTM D3492 test for holes.

New Sheik™ condoms were perforated twice with a stilette having a diameter of 0.0045 inches (0.11 mm). The condom was then spread on a test tube of a diameter which fit the condom without excessive stretch, so as to emulate a forming mold. The test tube was filled with a dark colored dye (Crystal violet) to provide contrast between the test tube and the material from which the condom was made. The tube and condom assembly were then dipped into a beaker containing isopropyl alcohol, in a manner so that only the exterior of the condom came into contact with the alcohol, except where a defect existed in the structure of the condom. There immediately appeared on the condom a stain with irregular borders some 5–7 mm in diameter. Removing the condom from the beaker, the stain spread while the alcohol on the surface rapidly evaporated. The stain could be seen for at least several minutes.

The condom was removed from the test tube. Its proximal end was placed over a 50 cc plastic syringe from which the nozzle had been removed. Water was added and the condom filled by gravity, with the last amount filled by pressurizing with the syringe's plunger. The condom was distended with 300 ml of water as required by the prescribed procedures of ASTM test D3492. No water leak was noted. The assemblage was then placed into a horizontal position. No leak was observed.

In this distended state, several more holes were produced with the same stilette. Drops did appear from a small proportion of these. There were no streams of water noted.

The same test was repeated with four more condoms (Trojan™ brand condoms). In two of the four condoms, beads of water appeared at the site of the hole disclosed by the alcohol. The defect in the condom was recognizable using the method of the current invention in all four condoms tested; in two of the four condoms tested using the ASTM test, the defect in the condom was not recognized.

It was concluded that the test method of the current invention using alcohol as the solvent is accurate in recognizing a hole of 0.0045" (0.11 mm) diameter, whereas the ASTM D3492 Test is not sensitive enough to consistently recognize a hole 0.0045" access in diameter. It was found that the method of the current invention is at least as sensitive as the ASTM Test, and probably more so.

Additionally, the ASTM test is acknowledgedly a destructive test, and therefore can only be a "referee" test. The testing method of the present invention is not destructive and could be carried out on all condoms rather than simply a representative portion.

For descriptive purposes, the method of the present invention has been particularly described in reference to evaluating the structural integrity of gloves and condoms which are applications for the preferred embodiments of the present invention. However, the present invention is not to be considered limited thereto. In this regard, the principles of the present invention may be readily adapted for evaluating the structural integrity of a variety of articles made from elastomeric materials including dental dams, face masks, finger cots, boots, socks and the like.

While the invention has been described herein, in connection with certain embodiments in detailed descriptions, it will be clear to one skilled in the art that modifications or variations of such detail can be made without deviating from the gist of the invention, and such modifications or variations are considered to be within the scope of the claims hereinbelow.

What is claimed is:

1. A method for testing the integrity of a personal barrier, which comprises:

(a) positioning a personal barrier over a mold, the mold being in the shape of the personal barrier;

(b) exposing the personal barrier to a non-corrosive solvent, wherein the solvent comprises a liquid with a surface tension less than or equal to 50 dyn/cm at 20° C., such that the solvent comes into contact with the exterior surface of the personal barrier only and is free to penetrate into or through any flaws thereon;

(c) removing the personal barrier from contact with the solvent; and (d) inspecting the exterior surface of the personal barrier for one or more stains at location(s) through which the solvent had penetrated which indicate the presence of a flaw or flaws in the structural integrity of the barrier.

2. The method of claim 1 wherein the solvent comprises isopropyl alcohol.

3. The method of claim 1 wherein the solvent comprises ethanol.

4. The method of claim 1 wherein the solvent further comprises a surfactant.

5. The method of claim 1 wherein the step of exposing the personal barrier to the solvent comprises immersing the personal barrier into the solvent.

6. The method of claim 1 wherein the step of exposing the personal barrier to the solvent comprises spraying the solvent onto the exterior surface of the personal barrier.

7. The method of claim 1 wherein the personal barrier is a glove.

8. The method of claim 1 wherein the personal barrier is a condom.

9. The method of claim 1 wherein the mold is formed of a material of contrasting color to the color of the personal barrier.

10. The method of claim 1 wherein the mold is formed of a translucent material.

11. A method for testing the integrity of a personal barrier, which comprises the steps of:

(a) positioning a personal barrier over a mold shaped as the personal barrier;

(b) exposing the personal barrier and mold to a non-toxic and non-corrosive solvent having a surface tension less than or equal to 50 dyn/cm at 20° C., such that the solvent comes into contact with the exterior surface of the personal barrier only and is free to penetrate into or through any flaws thereon;

(c) removing the personal barrier from contact with the solvent; and (d) inspecting the exterior surface of the personal barrier for one or more stains at location(s) through which the solvent has penetrated which indicate the presence of the flaw or flaws in the structural integrity of the personal barrier.

12. The method of claim 11 wherein the solvent comprises isopropyl alcohol.

13. The method of claim 11 wherein the solvent comprises ethanol.

14. The method of claim 11 wherein the step of exposing the barrier to the solvent comprises immersing the barrier into the solvent.

15. The method of claim 11 wherein the step of exposing the personal barrier to the solvent comprises spraying the solvent onto the exterior surface of the personal barrier.

16. The method of claim 11 wherein the personal barrier is a glove.

17. The method of claim 11 wherein the personal barrier is a condom.

* * * * *